March 23, 1965  J. H. LAMBIE  3,174,604
CLUTCH LEVER ARRANGEMENT FOR CONTROL OF GROUND DRIVEN PUMP
Filed Dec. 14, 1961  2 Sheets-Sheet 1

Inventor
James H. Lambie
By Charles L. Church
Attorney

United States Patent Office 3,174,604
Patented Mar. 23, 1965

3,174,604
CLUTCH LEVER ARRANGEMENT FOR CONTROL OF GROUND DRIVEN PUMP
James H. Lambie, Springfield, Ill., assignor to Allis-Chalmers Manufacturing Company, Milwaukee, Wis.
Filed Dec. 14, 1961, Ser. No. 159,399
2 Claims. (Cl. 192—99)

This invention relates to an improved control linkage for a clutch employed to connect and disconnect a ground driven pump.

It is an object of this invention to provide a control linkage for a clutch which selectively connects a pump in driven relation to the traction means of a vehicle wherein a pivotally mounted lever is movable from an over-center position in which it does not extend above the floor board of the vehicle to an operative position in which it extends above the level of the floor board and can be operated manually by the operator of the vehicle.

It is a further object of this invention to provide a control linkage for a ground driven pump which may be operated from the operator's compartment of the vehicle including a reciprocable member and a lever in abutting relation thereto which are biased toward one another by an interconnecting spring.

These and other objects and advantages of this invention will be apparent to those familiar with the art when the following description is read in conjunction with the drawings in which.

Figure 1:
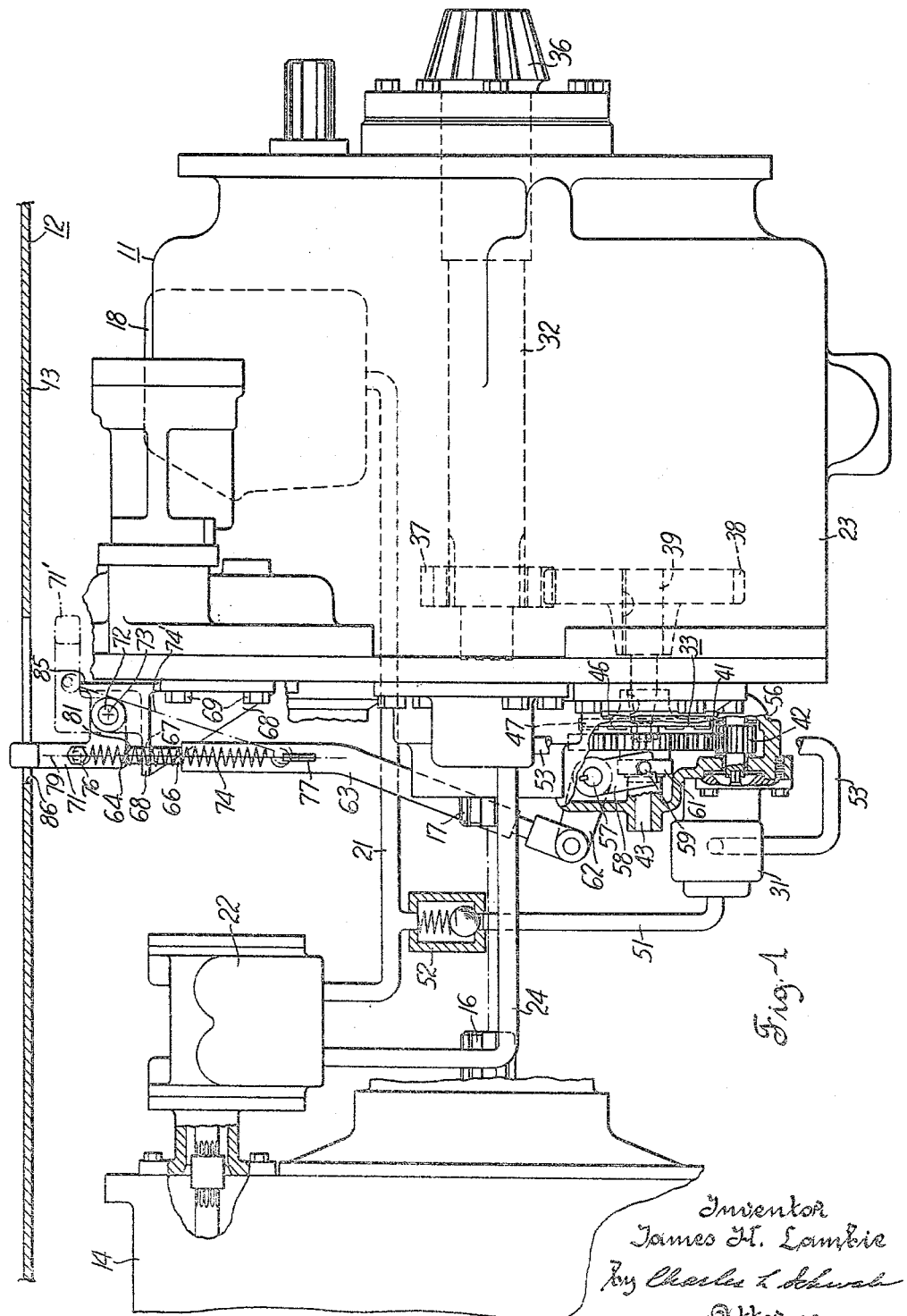
FIG. 1 is a side view of a power shift transmission and a portion of an engine wherein this invention is incorporated.

Referring to FIG. 1, a power shift transmission 11 is installed in a vehicle 12 having a floor board 13 of the operator's compartment or station disposed above the transmission. The transmission 11 is driven by an engine 14 through an engine output shaft 16 which is connected to universal joints, not shown, to the input shaft 17 of the transmission. The transmission includes a control valve 18 and hydraulically operated friction clutches similar to those shown in copending patent application S.N. 140,759 of Paul C. Temple on a hydraulic control. The control valve 18 is normally supplied with hydraulic fluid through a conduit 21 by a pump 22 driven by the engine 14 through gearing, not shown. Pump 22 draws fluid from a reservoir in the power shift transmission housing 23 through a conduit 24. When it is desired to start the engine, it will be appreciated that hydraulic fluid under pressure must be supplied to the hydraulically operated clutches of the transmission before drive can be established between the ground engaging traction means and the engine 14.

Figures 2, 3:
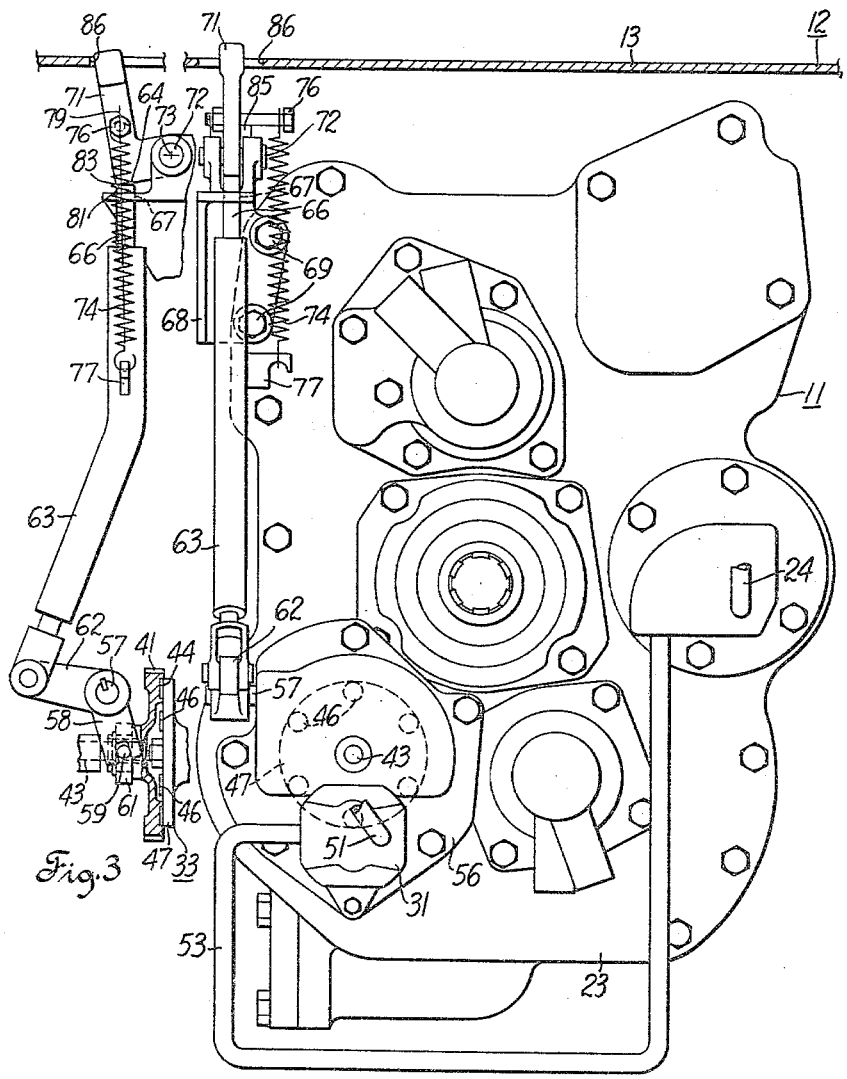
FIG. 2 is an end view of the power shift transmission of FIG. 1 showing the ground driven pump and linkage for controlling the clutch therefore.
FIG. 3 is a side view of the control linkage for the ground driven pump clutch showing the linkage in a clutch engaged position.

In order to provide pressure fluid when the engine is not operating and it is desired to start the engine by pushing the vehicle, there is provided a selectively operated ground driven pump 31 which is selectively connected in driven relation to the output shaft 32 by engagement of jaw type clutch 33. When the clutch 33 is engaged power is delivered from the ground engaging traction means through a bevel pinion 36, formed on the end of the output shaft 32, through gears 37, 38 secured for rotation with output shaft 32 and shaft 39, respectively, and through gears 41, 42. Gear 41 is slidably carried on a stationary stub shaft 43, as shown in FIG. 3. Pockets 44 are formed in the face of gear 41 for receiving button like projections 46 formed on an axially fixed hub 47 secured to shaft 39 for rotation therewith. FIG. 3 shows the clutch members 41 and 47 in engagement. When the clutch 33 is engaged the ground driven pump 31, which may be of the gear type, delivers oil through conduit 51 to the valve supply conduit 21 through a check valve 52. Check valve 52 prevents fluid from being delivered by engine driven pump 22 to the ground driven pump 31. The ground driven pump 31 draws oil from the sump of transmission housing 23 through a passage 53.

The clutch housing 56 in which gears 41, 42 are mounted also rotatably supports a transverse shaft 57 on which a yolk 58 is nonrotatably secured. The yolk 58 has a pair of legs with slots engaging oppositely disposed fingers 59 on sleeve 61 rotatably secured to the gear 41. A crank arm 62 is nonrotatably secured at one end to the shaft 57 and is pivotally connected at its other end to a reciprocable member 63 in the form of an upstanding link having a flat abutment portion presenting an abutment surface 64 formed at its upper end. The abutment surface 64 is formed on a cylindrically shaped upper portion 66 of link 63 at right angles to the link's direction of reciprocation and such portion reciprocates substantially vertically in a hole 67 formed in a bracket 68. The bracket 68 is secured to the transmission housing 23 by a pair of cap screws 69. The bracket 68 pivotally carries a manually operated element or lever 71 for operating link 63. Lever 71 is pivotally connected to the bracket by a pin 72, the axis 73 of which is disposed to one side of the line of force 79 exerted by resilient biasing means in the form of a spring 74. Spring 74 is connected at its opposite ends to bolt 76 on lever 71 and to hook 77 on link 63.

As shown in FIG. 1, the line of force 79 of spring 74 lies in a plane parallel to and spaced from the axis 73 about which lever 71 rotates. As shown in FIG. 1, the lever 71 is in a position ready for the operator to step on it with his foot to engage the ground driven pump clutch 33. When the operator steps on the lever 71, it is depressed to its clutch engaged position as shown in FIG. 3.

The foot operated lever 71 also has a safety position in which the spring 74 occupies an overcenter position, illustrated schematically by dot dash line 74', with relation to the axis 73 about which the lever pivots. The safety or overcenter position 71' is shown in phantom and in this position the lever 71 rests against a stop 85 formed on bracket 68. Thus the interconnecting spring 74 acts to hold the lever 71 in its overcenter position once it is placed there and in this position the operator is unable to operate it with his foot. To return the lever 71 to its upright operable position, the operator merely inserts his fingers through the opening 86 in the floor board 13, grasps the lever and rotates it to its upright, ready to operate position.

From the foregoing description it is obvious that I have provided an extremely novel and useful ground driven pump arrangement for power shift transmission fluid supply. Since the pump 31 is used frequently, a light duty inexpensive pump may be effectively used without sacrificing performance. By mounting the pump 31 and clutch 33 on the front of the transmission 11, it is conveniently disposed below the floor board 13, thereby permitting the clutch control linkage to be short in length and have a minimum of component parts. Also with this arrangement, the hydraulic conduits extending from the ground driven pump 31 to the hydraulic system for the hydraulically operated clutches of the transmission, may be of short length thereby minimizing cost and installation requirements.

Although a single embodiment of this invention has been illustrated and described, it should be understood that it is not intended to so limit this invention, but rather this invention shall include those embodiments fairly embraced by the scope of the appended claims.

What is claimed is:

1. An operating linkage for a clutch adapted to selectively connect a ground driven pump in driven relation to the output shaft of a vehicle transmission, comprising: a transmission housing, a link reciprocably mounted on said housing and having an abutment portion at one end, a lever pivotally mounted on said transmission housing and having an abutment face engageable with said abutment portion, and resilient biasing means interconnecting said lever and link for urging said lever and link to an engaging position in which said face and portion are in engagement, said lever being movable to an overcenter safety position in which it is releasably retained by said biasing means and in which said face and portions are not in engagement.

2. An operating linkage for a clutch adapted to selectively connect a ground driven pump in driven relation to the output shaft of a vehicle transmission, comprising: a transmission housing, a link reciprocably mounted on said transmission housing and having a flat abutment surface at its upper end at approximate right angles to the direction of reciprocation of said link, said link being reciprocably movable to clutch engaged and clutch disengaged positions, a lever pivotally mounted on said transmission housing and having an abutment face engageable with said abutment surface, and resilient biasing means interconnecting said lever and link for urging said lever and link to an engaging position in which said face and surface are in seated engagement, said lever being movable to an overcenter safety position in which it is releasably retained by said biasing means and in which said face and surface are disengaged, said lever being manually movable to a clutch engaged position wherein said link is moved to its clutch engaged position through thrust transmitted from said face to said surface, and said link being releasably retained in its clutch disengaged position by said biasing means when said lever is in its overcenter safety position.

References Cited by the Examiner
UNITED STATES PATENTS

| | | | |
|---|---|---|---|
| 1,978,658 | 10/34 | Wemp | 192—99 X |
| 2,945,574 | 7/60 | Plume | 192—85 |
| 2,957,358 | 10/60 | Anderson | 192—89 |
| 3,014,377 | 12/61 | Anderson et al. | 192—99 X |

FOREIGN PATENTS

| | | |
|---|---|---|
| 379,873 | 11/07 | France. |
| 935,533 | 11/55 | Germany. |

DAVID J. WILLIAMOWSKY, *Primary Examiner.*

BROUGHTON G. DURHAM, *Examiner.*